United States Patent [19]
Blatt et al.

[11] Patent Number: 5,271,651
[45] Date of Patent: Dec. 21, 1993

[54] WORK HOLDER SUPPORT APPARATUS

[75] Inventors: John A. Blatt, 22 Stratton Pl, Grosse Pointe Shores, Mich. 48236; David C. Tomlin, Mt. Clemens, Mich.

[73] Assignee: John A. Blatt, Grosse Pointe Shores, Mich.

[21] Appl. No.: 563,253

[22] Filed: Aug. 6, 1990

Related U.S. Application Data

[63] Continuation-in-part of Ser. No. 271,178, Nov. 14, 1988, Pat. No. 4,957,318.

[51] Int. Cl.$^5$ .............................. B25J 15/08
[52] U.S. Cl. .................... 294/88; 294/86.4; 248/288.3; 248/288.5
[58] Field of Search ............... 294/88, 86.4; 248/288.5, 288.3, 484, 487; 403/90, 56, 55

[56] References Cited

U.S. PATENT DOCUMENTS

| | | |
|---|---|---|
| 229,670 | 7/1880 | Carrick . |
| 1,468,110 | 9/1923 | Howe ........................ 248/229 X |
| 1,543,037 | 6/1925 | Teeter ........................ 403/56 |
| 1,929,361 | 10/1933 | Liljebladh . |
| 2,141,945 | 12/1938 | Tweedale .................. 403/56 X |
| 2,212,156 | 8/1940 | Erdley ....................... 248/229 |
| 2,295,051 | 9/1942 | Roth . |
| 2,452,406 | 10/1948 | Volkery et al. ........... 403/391 |
| 2,469,542 | 5/1949 | Becker ....................... 403/391 X |
| 2,565,793 | 8/1951 | Weismantel ............... 248/205.9 X |
| 2,651,026 | 9/1953 | Roth . |
| 2,776,168 | 1/1957 | Schweda ................... 248/288.5 X |
| 2,791,623 | 5/1957 | Lock et al. . |
| 2,858,522 | 10/1958 | Wengen et al. ........... 403/391 X |
| 3,146,982 | 9/1964 | Budnick .................... 248/229 X |
| 3,349,927 | 10/1967 | Blatt . |
| 3,568,959 | 3/1971 | Blatt . |
| 3,613,904 | 10/1971 | Blatt . |
| 3,677,584 | 7/1972 | Short . |
| 3,712,415 | 1/1973 | Blatt et al. . |
| 4,275,872 | 6/1981 | Mullis . |
| 4,355,922 | 10/1982 | Sato .......................... 248/229 X |
| 4,382,572 | 5/1983 | Thompson ................. 248/484 |
| 4,453,755 | 6/1984 | Blatt et al. . |
| 4,480,497 | 11/1984 | Locher ....................... 403/328 X |
| 4,495,834 | 1/1985 | Bauer et al. ............... 403/328 X |
| 4,515,336 | 5/1985 | Fischer ...................... 248/288.3 |
| 4,708,297 | 11/1987 | Boers ........................ 403/328 X |

Primary Examiner—Margaret A. Focarino
Assistant Examiner—Joseph D. Pape
Attorney, Agent, or Firm—Basile and Hanlon

[57] ABSTRACT

A work holder support apparatus includes an elongate support member having an undercut longitudinal slot. A base plate at one side of the support member carries a spherical ball and a clamp bolt seated in a recessed bore in the ball passes through the base plate and slot to be threadably received in a first clamp plate at the opposite side of the support member. An elongate work holder mounting member and a second clamp plate cooperatively define a ball receiving socket at one end of the mounting member enabling the mounting member to be clamped at any of a wide range of rotative adjustments relative to the ball. An opening into the socket affords access to the recessed clamping bolt head.

9 Claims, 4 Drawing Sheets

WORK HOLDER SUPPORT APPARATUS

RELATED APPLICATIONS

This application is a continuation-in-part of copending U.S. patent application Ser. No. 07/271,178 filed Nov. 14, 1988, now U.S. Pat. No. 4,957,318.

BACKGROUND OF THE INVENTION

The present invention relates to a support apparatus for supporting work holders, particularly in applications where a plurality of work holding devices are employed to grip or clamp a panel type work piece at several different locations to stably support the panel either in a fixed position for the performance of a work operation on the panel or to transfer the panel from one work station to another.

An apparatus of this type is typically, but not exclusively, used in automotive related applications to handle panels which are to be subsequently assembled into a vehicle door or vehicle body. These panels typically have lengths and widths of two or more feet and are frequently of irregular shape or formed with irregular openings so that in order to stably and firmly support the panel, it is necessary that the work holders grip the panel at several locations along its peripheral edge or the edges of major openings in the panel. The work holders, which typically take the form of grippers of a general type shown in U.S. Pat. No. 3,635,514 or U.S. Pat. No. 4,449,745, clamps or vacuum cups, are typically mounted on support members or a support frame by means of a ring type clamp which is received on a cylindrical support rod. This arrangement allows the individual work holder to be adjusted longitudinally of the support rod and rotatively about the axis of the support rod and then clamped by the ring clamp in the adjusted position. Because of the irregular shape of panels handled by this particular type of apparatus and the fact that automated production procedures can require extremely precise positioning of the panel relative to tooling employed to operate on the panel, the two degree of freedom adjustment capability of the rod-ring clamp arrangement just described does not always enable all of several work holders to be accurately and independently positioned relative to one another. The present invention is directed to a work holder support apparatus which provides a greatly improved flexibility of adjustment.

SUMMARY OF THE INVENTION

In accordance with the present invention, a support member takes the form of an elongate hollow tubular member having a longitudinal slot through one web or side wall. A spherical ball is fixedly mounted on a base plate which will bridge the slot on the outer side of the web of the support member and a clamping bolt with a head recessed in the ball passes diametrically through the ball, base plate and slot to be threadably received by a clamping plate bridging the slot at the inner side of the support web. This arrangement permits the ball to be clamped in any selected position longitudinally of the support member.

An elongate work holder mounting member has a clamp plate mounted at one end to the mounting member by a pair of clamping screws. The opposed faces of the clamp member and the mounting member end are formed with concave recesses which cooperatively define a ball receiving socket by means of which the mounting member and clamp plate may be clamped to the ball at selected positions of rotary adjustment in any of three mutually perpendicular planes intersecting the center of the spherical ball. Bores or other structure for mounting a work holder are located on the mounting member adjacent the end of the mounting member remote from the clamping member.

In accordance with a preferred embodiment of the present invention, an elongate work holder mounting member has first and second clamping plates mounted at each end to the mounting member by a pair of clamping screws. The opposed faces of the clamping members and the mounting member ends are formed with concave recesses which cooperatively define first and second ball receiving sockets by means of which the mounting member and clamp plates may be clamped to first and second balls at selected positions of rotary adjustment in any of three mutually perpendicular planes intersecting the center of each spherical ball. In this embodiment, a mounting plate is provided with suitable means for mounting a work holder on the remote or distal end of the mounting member. The mounting plate includes the second spherical ball.

Other objects and features of the invention will become apparent by reference to the following specification and to the drawings.

DESCRIPTION OF THE PREFERRED EMBODIMENT

Figure 1:
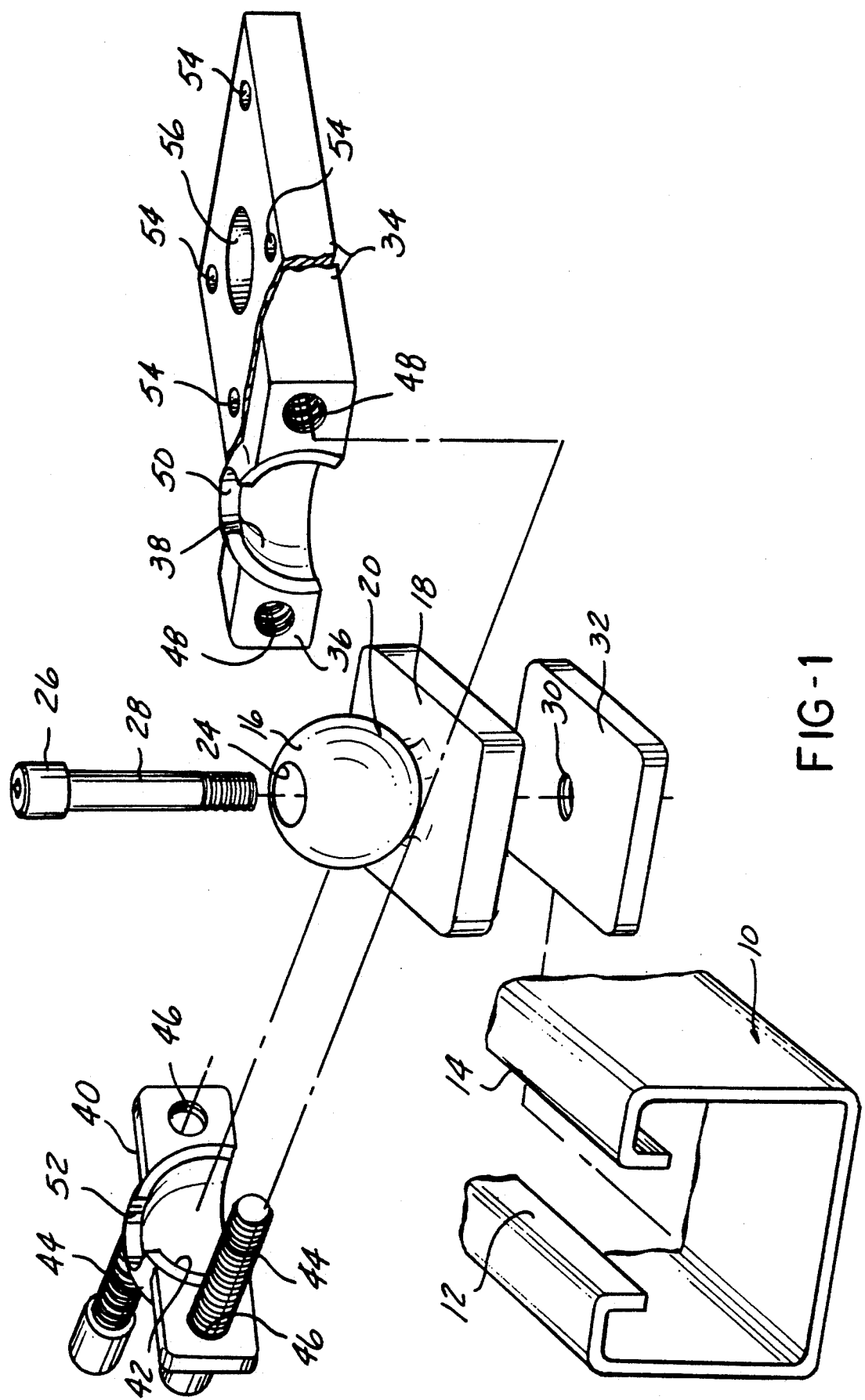
FIG. 1 is an exploded perspective view of the components of the present invention.

A work holder support apparatus embodying the present invention employs a support member in the form of a rigid elongate hollow tubular support member 10 formed with an elongate slot 12 extending lengthwise of one side 14 of member 10. The support member 10 shown in the drawings is of hollow box shaped transverse cross section, other cross sectional configurations may obviously be used, as long as the configuration presents a longitudinally extending undercut slot.

Figure 2:
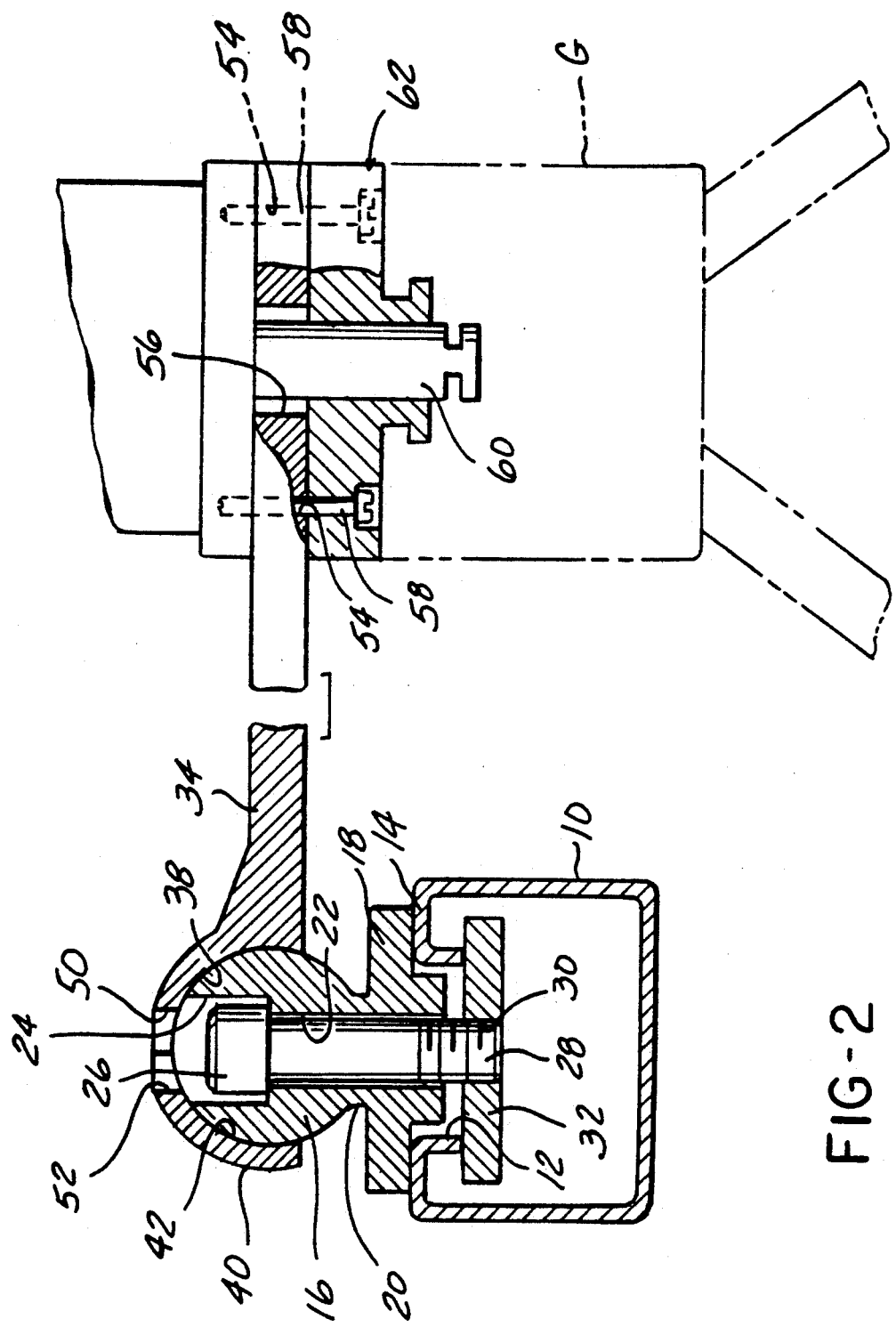
FIG. 2 is a cross sectional view, with certain parts broken away or shown only partially in section, of an assembled apparatus embodying the present invention.

A spherical ball 16 is fixedly mounted on a base plate 18, the ball as shown being integrally formed on the base plate and coupled to the base plate via a reduced diameter neck 20. A bore 22 extends diametrically through the ball neck and base plate and is formed with an enlarged diameter counter bore 24 at its upper end which defines a recessed seat for the head 26 of a clamping bolt 28. As best seen in FIG. 2, the lower end of bolt 28 projects downwardly from base plate 18 through slot 12 and is threadably received in a tapped bore 30 through a clamp plate 32 located in the interior of support member 10 and bridging slot 12. It is believed apparent that bolt 28 may be loosened a sufficient amount to permit the base plate and clamping plate to be slid longitudinally along web 14 to a selected position of longitudinal adjustment relative to support member 10 and then fixedly clamped in the selected position by tightening bolt 28 to clamp web 14 between base plate 18 and clamp plate 32.

A work holder mounting member in the form of an elongate plate like member 34 is formed with a flat end face 36 (FIG. 1) which in turn is formed with a concave semi-spherical recess 38 of a diameter equal to that of ball 16. A clamping plate 40 is formed with a semispherical recess 42 of similar shape and is mounted on the end 36 of mounting member 34 by means of a pair of clamping screws 44 which pass through bores 46 in clamping plate 40 to be threadably received in tapped bores 48 in end 36 of mounting plate 34. When assembled to each other, the clamping plate 40 and mounting member 34 are coupled to base plate 18 by a ball and socket joint constituted by ball 16 and the socket cooperatively defined by the recesses 38 and 42 in mounting member 34 and clamp plate 40. It is believed apparent that this coupling enables the adjustment of mounting plate 34 relative to ball 16 about any of three mutually perpendicular axes intersecting at the geometrical center of ball 16. Mounting member 34 and clamp plate 40 are provided with semicircular openings 50, 52 respectively which cooperatively define an access opening into the "socket" affording access to the head 26 of clamping bolt 28 when the mounting member 34 and clamp plate 40 are mounted on ball 16.

The end of mounting member 34 remote from clamp plate 40 is provided with suitable means for mounting a work holder on the remote or distal end of the mounting member. In the particular form shown in the drawings, four symmetrically disposed bores 54 are located around a relatively large central bore 56 as best seen in FIG. 1 to provide openings through which a gripper actuator may be fixedly mounted on mounting member 34 as by bolts 58 passing through bores 54 with the piston rod 60 of the gripping actuator passing freely downwardly through bore 56. The gripper assembly G, in addition to the actuator, may include a quick disconnect coupling arrangement designated generally 62, see U.S. Pat. No. 4,596,415 for further details of a suitable quick disconnect coupling, or alternatively, the gripper may be provided with a swivelling jaw, as disclosed in U.S. Pat. No. 3,635,514, which enables the jaws of the gripper to be rotatively adjusted about the axis of its piston rod.

The combination of the capability of adjustably positioning ball 16 at any position longitudinally of support member 10 with the ball and socket interconnection between the ball and mounting member 34 enabling mounting member 34 to be rotatively adjusted about any of three mutually perpendicular axes intersecting at the center of ball 16, provides an extremely flexible positioning capability for the work holder mounted on the mounting member. By rotatively adjusting mounting member 34 about a vertical axis (the axis of bore 22 through the ball) the horizontal offset between the outer end of member 34 and support member 10 may be selected to be any distance equal to or less than the length of mounting member 34. Insofar as vertically positioning the distal end of mounting member 34, the member may be rotated about a horizontal axis parallel to slot 12 through an angle as viewed in FIG. 2 limited by the clearance between the lower side of mounting member 34 and base plate 18 and an upper limit limited by the engagement between the lower side of clamping plate 40 as viewed in FIG. 2 and base plate 18. The mounting member may be also rotatively adjusted relative to the ball about the longitudinal axis of the mounting member to tilt the work holder. When the work holder is provided with a swivel jaw device, such as that disclosed in U.S. Pat. No. 3,635,514, the orientation of the gripper jaws may be adjusted to match the configuration of the portion of the work piece which the jaws are to engage.

Referring now to FIGS. 3-6, a preferred embodiment of the present invention includes a support member in the form of a rigid elongate hollow tubular support member 10 formed with an elongate slot 12 extending lengthwise of one side 14 of member 10. The support member 10 shown in the drawings is of a hollow boxed shaped transverse cross section, other cross sectional configurations may obviously be used.

As previously described for FIGS. 1 and 2, a spherical ball 16 is fixedly mounted on a base plate 18, the ball as shown being integrally formed on the base plate and coupled to the base plate by a reduced diameter neck 20. A bore 22 extends diametrically through the ball neck and base plate and is formed with an enlarged diameter counter bore 24 at its upper end which defines a recessed seat for the head 26 of a clamping bolt 28. The lower end of bolt 28 projects outwardly from base plate 18 through slot 12 and is threadably received in a tapped bore 30 through a clamp plate 32 located in the interior of support member 10 and bridging slot 12. It is believed apparent that the bolt 28 may be loosened a sufficient amount to permit the base plate and clamping plate to be slid longitudinally along web 14 to a selected position of longitudinal adjustment relative to support member 10 and then fixedly clamped in the selected position by tightening bolt 28 to clamp support sidewall 14 between base plate 18 and clamp plate 32.

A work holder mounting member in the form of an elongate plate like member 64 is formed with first and second flat end faces 66a and 66b which in turn are formed with first and second concave semi-spherical recesses 68a and 68b. The recesses 68a and 68b have diameters generally equal to that of balls 16 and 82 respectively. First and second clamping plates 70a and 70b are formed with concave semi-spherical recesses 72a and 72b of similar shape and are mounted on the respective end faces 66a and 66b of mounting member 64 by means of a pair of clamping screws 74 which pass through bores 76 in clamping plate 70a to be threadably received in tapped bores 74a in clamping plate 74b. When assembled to each other, the clamping plate 70a and mounting member 64 are coupled to base plate 18 by a ball and socket joint defined by ball 16 and the socket cooperatively defined by the recesses 68a and 72a in the mounting member 64 and clamp plate 70a. It is believed apparent that this coupling enables the adjustment of mounting plate 64 relative to ball 16 about any of three mutually perpendicular axis intersecting at the geometrical center of ball 16.

Figure 3:
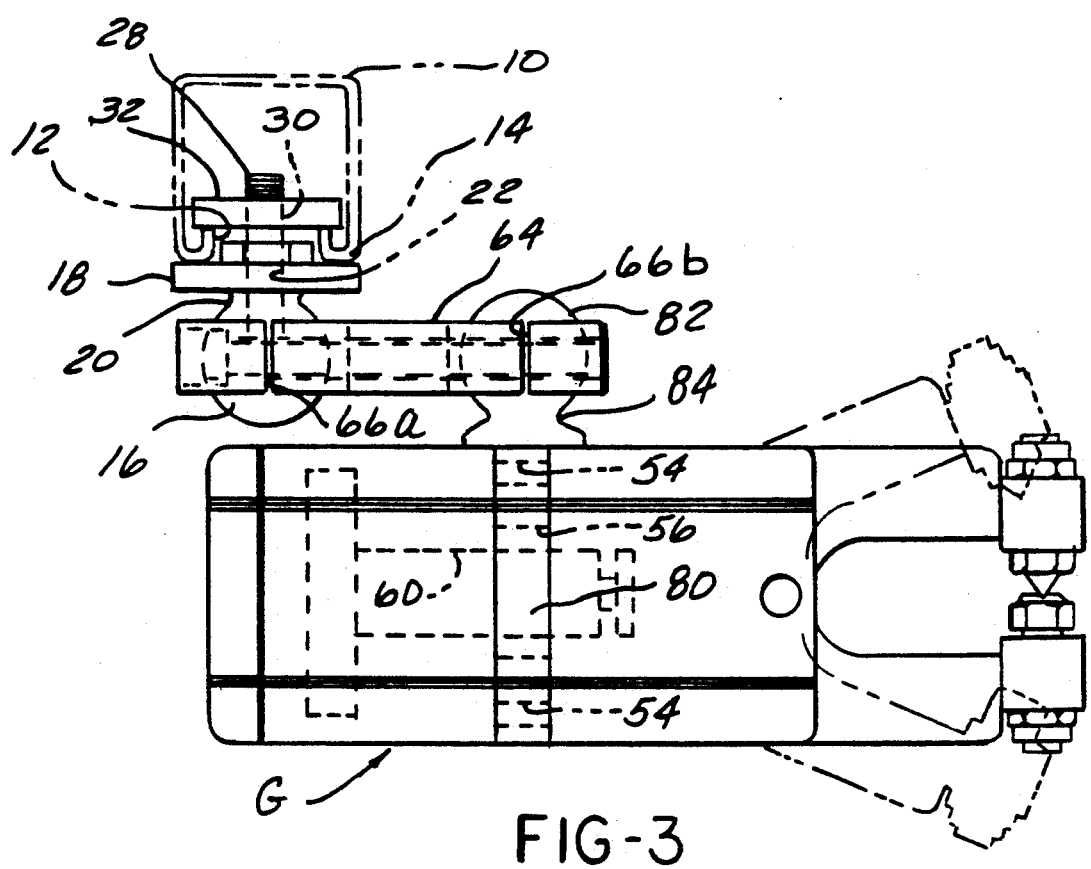
FIG. 3 is a side elevational view of a work holder support apparatus according to a preferred embodiment of the present invention.
Figure 4:
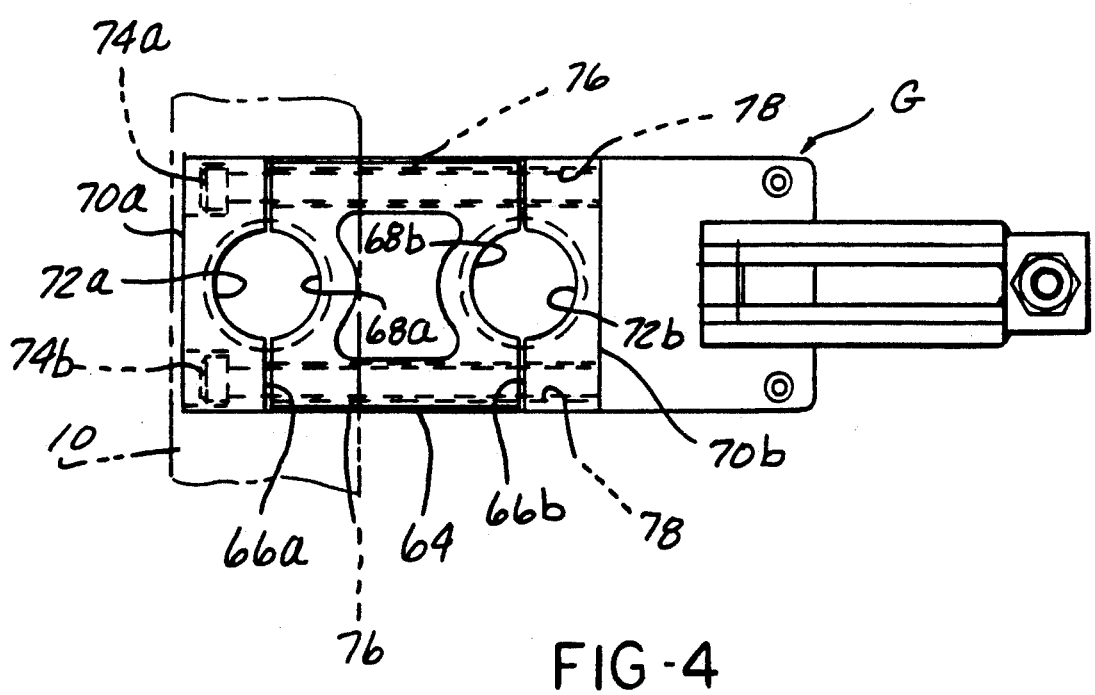
FIG. 4 is a plan view of the work holder support apparatus as shown in FIG. 3.
Figure 5:
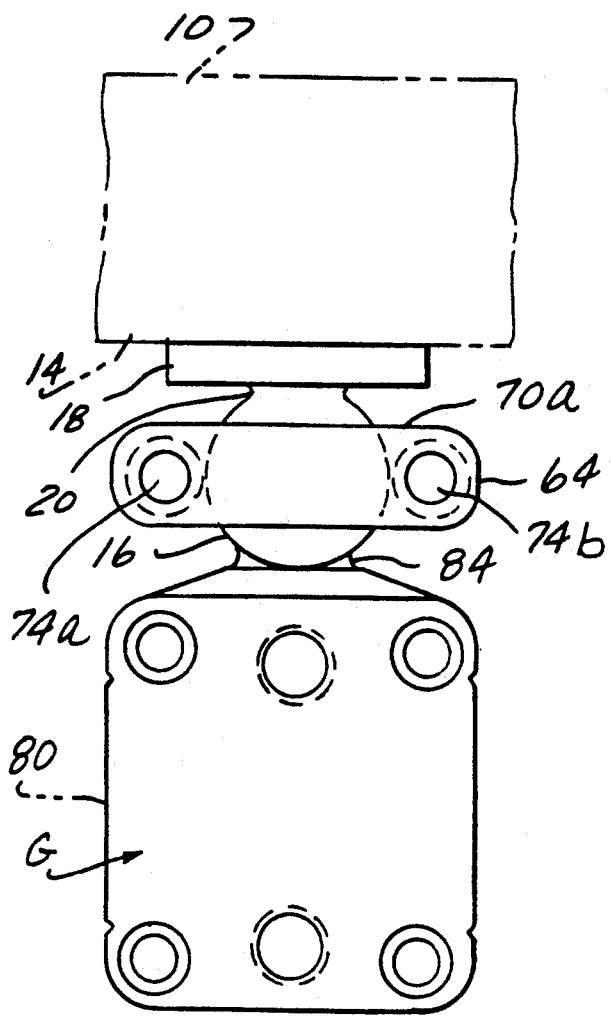
FIG. 5 is an end view of the work holder support apparatus as shown in FIG. 3.
Figure 6:
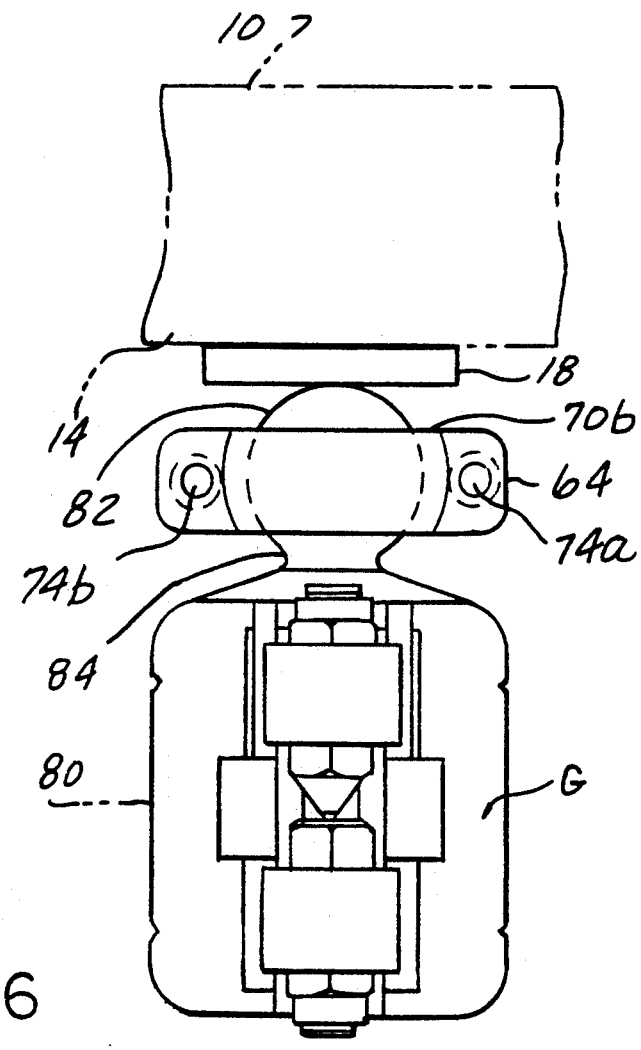
FIG. 6 is an opposite end view of the work holder support apparatus shown in FIG. 3.

The end of mounting member 64 remote from clamp plate 70a is provided with suitable means for mounting a work holder on the remote or distal end of the mounting member. In this preferred embodiment, the means for mounting includes a mounting plate 80 having a spherical ball 82 fixedly mounted on mounting plate 80. The ball 82 as shown being integrally formed on the mounting plate 80 and coupled to the mounting plate 80 via a reduced diameter neck 84. The mounting plate 80, in its preferred form, includes four symmetrically disposed bores 54 which are located around a relatively large central bore 56 to provide openings through which a gripper actuator may be fixedly mounted on mounting plate 80 as by bolts 58 passing through bores 54 with a piston rod 60 of a gripping actuator passing freely through the relatively large central bore 56 as illustrated in FIGS. 1-3. When assembled to each other, the clamping plate 70b and mounting member 64 are coupled by a ball and socket joint defined by ball 82 and the socket cooperatively defined by the recesses 68b and 72b in mounting member 64 and clamp plate 70b. It is believed apparent that this coupling enables the adjustment of mounting plate 64 relative to ball 82 about any of three mutually perpendicular axis intersecting at the geometrical center of ball 82. It is also believed apparent that the mounting plate 80 can be formed in any desired configuration, such that the ball 80 may be extending outwardly from the gripper assembly along any peripheral side edge desired.

The combination of the capability of adjustably positioning ball 16 at any position longitudinally of support member 10 with the first ball and socket interconnection between the ball 16 and mounting member 64 and the second ball and socket interconnection between the ball 82 and the mounting member 64 enabling mounting member 64 to be rotatably adjusted about any of three mutually perpendicular axis intersecting at the center of ball 16 and also rotatably adjusted about any of three mutually perpendicular axis intersecting at the center of ball 82, provides an extremely flexible positioning capability for the work holder mounted on the mounting member 64. The mounting member 64 can be rotated in a plane normal to the longitudinal axis of bore 22 through spherical ball 16. In addition, the mounting member 64 can be rotated in a plane containing the longitudinal axis of bore 22 of spherical ball 16. Furthermore, the mounting member 64 can be rotated about the longitudinal axis of mounting member 64 within the physical limits of the ball and socket structure. It should also be apparent, that the work holder can be rotated in a plane parallel to the mounting member 64, rotated in a plane perpendicular to the mounting member 64, and the mounting member 64 can be rotated about its longitudinal axis with respect to the ball 82 within the structural limits of the first and second ball and socket joints. The work holder may also be provided with a swivel jaw device, such as that disclosed in U.S. Pat. No. 3,635,514, so that the orientation of the gripper jaws may be adjusted to match the configuration of the portion of the work piece which the jaws are to engage. In addition, the gripper assembly may include a quick disconnect coupling arrangement such as that disclosed in U.S. Pat. No. 4,596,415 if desired.

While one specific embodiment of the invention has been described in detail, as noted above, the disclosed embodiment may be modified. Therefore, the foregoing description is to be considered exemplary, rather than limiting, and the true scope of the invention is that defined in the following claims.

What is claimed is:

1. A work holder support apparatus for supporting a workpiece holder having a fluid operated actuator portion and a workpiece gripper portion from a support member comprising:

means defining a spherical ball mounted on said support member at a desired location, wherein said means defining a spherical ball further includes:

a spherical ball fixedly mounted on a baseplate having a bore extending diametrically through said ball and baseplate with a counterbore opening at the ball side of the bore remote from said baseplate;

a clamp plate having a tapped bore therethrough;

a clamp bolt having a head seated in said counterbore and projecting through said bore into threaded engagement in said tapped bore of said clamping plate; and said support member having an open longitudinal slot extending along one side thereof, wherein said bolt extends through said slot with said support member interposed between said clamp plate and said baseplate allowing said spherical ball to be positioned in a desired longitudinal position along said slot of said support member;

an elongated bracket having first and second ends; a first clamp plate engageable with the first end of said elongated bracket with socket means disposed between said bracket and said first clamp plate defining a semi-spherical aperture for engaging the spherical ball means such that said bracket is rotatable about said spherical ball means for locating said bracket in a desired orientation between said support member and holder;

locking means for locking said clamp plate against rotative movement with respect to said spherical ball means to hold said bracket in said desired orientation; and connecting means for connecting said bracket to said holder.

2. A work holder support apparatus for supporting a workpiece holder having a fluid operated actuator portion and a workpiece gripper portion from a support member comprising:

means defining a spherical ball mounted on said support member at a desired location;

an elongated bracket having first and second ends;

a first clamp plate engageable with the first end of said elongated bracket with socket means disposed between said bracket and said first clamp plate defining a semi-spherical aperture for engaging the spherical ball means such that said bracket is rotatable about said spherical ball means for locating said bracket in a desired orientation between said support member and holder;

locking means for locking said first clamp plate against rotative movement with respect to said spherical ball means to hold said bracket in said desired orientation; and connecting means for connecting said bracket to said holder, wherein said connecting means further includes:

a mounting plate having a spherical ball integrally formed on one peripheral edge and aperture means formed in said plate allowing attachment to said holder;

a second clamp plate engageable with said second end of said elongate bracket with socket means formed between said second end of said bracket and said second clamp plate cooperatively defining a semi-spherical socket adapted to partially enclose said spherical ball on said mounting plate; and locking means for locking said second clamp plate against rotative movement with respect to said ball.

3. The work holder support apparatus of claim 2 wherein said mounting plate is disposed between said fluid operated actuator portion and said work piece gripper portion of said work holder and further includes a relatively large aperture allowing passage of a driven member extending from said fluid operated actuator portions for engagement with said work piece gripper portion of said work holder.

4. A work piece support apparatus for supporting a work piece holder having a fluid operated actuator portion and a work piece gripper portion from a support member comprising:
- a first spherical ball fixedly mounted on a base plate having a bore extending diametrically through said ball and base plate with a counter bore opening at the ball side of the bore remote from said base plate;
- a first clamp plate having a tapped bore therethrough;
- a first clamp bolt having a head seated in said counter bore and projecting through said bore into threaded engagement in said tapped bore of said first clamp plate;
- said support member having an open longitudinal slot extending along one side thereof, wherein said first clamp bolt extends through said slot with said support member interposed between said first clamp plate and said base plate allowing said first spherical ball to be positioned in a desired longitudinal position along said slot of said support member;
- an elongated bracket having first and second ends;
- a second clamp plate engageable with the first end of said elongated bracket with socket means disposed between said bracket and said second clamp plate cooperatively defining a semi-spherical aperture for engaging the first spherical ball such that said bracket is rotatable about said first spherical ball for locating said bracket in a desired orientation between said support member and holder;
- a mounting plate having a second spherical ball integrally formed on one peripheral edge and aperture means formed in said plate allowing attachment to said work holder;
- a third clamp plate engageable with said second end of said elongate bracket with socket means formed between said second end of said bracket and said third clamp plate cooperatively defining a semi-spherical socket adapted to partially enclose said second spherical ball on said mounting plate for locating said work holder in a desired orientation with respect to said bracket; and
- locking means for locking said second and third clamp plates against rotative movement with respect to said first and second spherical balls respectively.

5. The work holder support apparatus of claim 4 wherein said mounting plate is disposed between said fluid operated actuator portion and said work piece gripper portion of said work holder and further includes a relatively large aperture allowing passage of a driven member extending from said fluid operated actuator portion for engagement with said work piece gripper portion of said work piece holder.

6. The work piece support apparatus of claim 4, wherein said locking means comprises:
- said second clamp plate having at least one aperture formed therein;
- said bracket having at least one longitudinal aperture therethrough in coaxial alignment with the aperture formed in the second clamp plate;
- said third clamp plate having at least one threaded aperture in coaxial alignment with said longitudinal aperture of said bracket; and
- at least one bolt engageable through said aligned apertures and mateable with said threads of said aperture in said third clamp plate for holding said second and third clamp plates in position with respect to said bracket and for locking said first and second spherical balls in position with respect to said bracket.

7. A work holder support apparatus comprising a support member including an elongate web having a longitudinally extending slot therethrough, a spherical ball fixedly mounted on a base plate supported on one side of said web, a first bore extending diametrically through said ball and said base plate and having a counter bore opening at the side of said ball remote from said base plate, a first clamp plate located at the opposite side of said web and having a tapped bore therethrough, a clamp bolt having a head seated in said counter bore and projecting through said first bore and said slot into threaded engagement in said tapped bore in said first clamp plate for clamping said base plate to said web at a selected position longitudinally of said support web, an elongate mounting member, a second clamp plate, clamp screw means mounting said second clamp plate on one end of said mounting member with one side of said second plate in facing opposed relationship to said one end of said mounting member, socket defining means on said second clamp plate and at said one end of mounting member cooperatively defining a spherical socket conformed to partially enclose said ball in a ball and socket joint relationship, said clamp screw means being operable when tightened to fixedly clamp said mounting member against rotative movement relative to said ball.

8. The work holder support apparatus of claim 7 wherein said socket defining means includes means defining an access opening affording access to said clamp bolt while said ball is located in said socket.

9. The work holder support apparatus of claim 7 further comprising a work holder mounting plate having a second spherical ball formed thereon, a third clamp plate, said clamp screw means mounting said third clamp plate on another end of said mounting member with one side of said third plate in facing opposed relationship to said other end of said mounting member, second socket defining means on said third clamp plate and at said other end of said mounting member cooperatively defining a second spherical socket conformed to partially enclose said second ball in a ball and socket joint relationship.

* * * * *